US012561960B2

(12) United States Patent
Tseng et al.

(10) Patent No.: US 12,561,960 B2
(45) Date of Patent: Feb. 24, 2026

(54) IMAGE RECOGNITION SYSTEM AND METHOD THEREOF

(71) Applicant: Wistron NeWeb Corporation, Hsinchu (TW)

(72) Inventors: Sheng-Fa Tseng, Hsinchu (TW); Cheng Jung Wen, Hsinchu (TW); Wen-Jin Lee, Hsinchu (TW)

(73) Assignee: WISTRON NEWEB CORPORATION, Hsinchu (TW)

( * ) Notice: Subject to any disclaimer, the term of this patent is extended or adjusted under 35 U.S.C. 154(b) by 24 days.

(21) Appl. No.: 18/604,608

(22) Filed: Mar. 14, 2024

(65) Prior Publication Data

US 2024/0312192 A1     Sep. 19, 2024

(30) Foreign Application Priority Data

Mar. 15, 2023    (TW) ................................. 112109501

(51) Int. Cl.
 *G06V 10/776*     (2022.01)
 *G06V 20/52*     (2022.01)
 *H04N 7/18*     (2006.01)
 *H04N 23/90*     (2023.01)
(52) U.S. Cl.
 CPC ............ *G06V 10/776* (2022.01); *G06V 20/52* (2022.01); *H04N 7/181* (2013.01); *H04N 23/90* (2023.01)
(58) Field of Classification Search
 CPC ........ H04N 23/90; H04N 7/181; H04N 23/67; H04N 23/80; H04N 23/95; H04N 23/555; H04N 23/56; H04N 23/673; G06V 20/52; G06V 10/776

USPC .......................................................... 348/159
See application file for complete search history.

(56) References Cited

U.S. PATENT DOCUMENTS

| | | | |
|---|---|---|---|
| 8,391,560 B2 | 3/2013 | Tsai et al. | |
| 9,158,964 B2 | 10/2015 | Li et al. | |
| 2010/0278436 A1* | 11/2010 | Tsai ...................... | G06V 20/63 |
| | | | 382/209 |

FOREIGN PATENT DOCUMENTS

| | | | | |
|---|---|---|---|---|
| CN | 102831385 A | 12/2012 | | |
| CN | 110971812 B | * 3/2022 | ........... | H04N 23/611 |
| TW | I384408 B | 2/2013 | | |
| TW | I512638 B | 12/2015 | | |

* cited by examiner

*Primary Examiner* — Masum Billah
(74) *Attorney, Agent, or Firm* — McClure, Qualey & Rodack, LLP

(57)     ABSTRACT

An image recognition system and an image recognition method are provided. The image recognition system includes a first image capturing device for capturing a first image in a first angle of view, a second image capturing device for capturing a second image in a second angle of view, and a processing device having a recognition module and a judgment module. The recognition module identifies an object within the first angle of view to obtain a first recognition accuracy and identifies the object within the second angle of view to obtain a second recognition accuracy. The judgment module generates an overall recognition accuracy based on the first recognition accuracy and the second recognition accuracy, confirms whether the overall recognition accuracy satisfies an accuracy threshold to generate a confirmation result, and determines whether to adjust a weight value corresponding to the second image capturing device according to the confirmation result.

14 Claims, 8 Drawing Sheets

IMAGE RECOGNITION SYSTEM AND METHOD THEREOF

RELATED APPLICATIONS

This application claims priority to Taiwan Application Serial Number No. 112109501, filed Mar. 15, 2023, which is herein incorporated by reference.

BACKGROUND

Technical Field

The present disclosure relates to an image recognition system and a method thereof. More particularly, the present disclosure relates to an image recognition system and an image recognition method for enhancing the image recognition effect.

Description of Related Art

Existing image surveillance systems use a single camera combined with image recognition function or a set of cameras combined with radar to monitor intruders. However, the single-camera surveillance method is easily affected by environmental factors such as lens failure, dirt, obstruction, or backlighting from light angles, resulting in problems such as blurred images or difficulty in identification, and the calculation of the relative distance between intruders and the camera is prone to huge errors when only a single camera is used. As for the camera-radar surveillance method, requires time-consuming calibrations during radar installation are required, and misjudgments may also occur after installation due to obstructions in the monitoring environment.

In view of this, an image recognition system and a method thereof that has high recognition level and high detection accuracy and does not require time-consuming calibrations during installation are indeed highly anticipated by the public and become the goal and the direction of relevant industry efforts.

SUMMARY

According to one aspect of the present disclosure, an image recognition system for identifying an object in a target area includes a first image capturing device, at least one second image capturing device, and a processing device. The first image capturing device captures a first image in a first angle of view of the target area. The at least one second image capturing device captures a second image in a second angle of view of the target area. The processing device is signally connected to the first image capturing device and the at least one second image capturing device and includes a recognition module and a judgment module. The recognition module obtains the first image and the second image, identifies the object from the first angle of view to obtain a first recognition accuracy, and identifies the object from the second angle of view to obtain a second recognition accuracy. The judgment module generates an overall recognition accuracy based on at least one of the first recognition accuracy and the second recognition accuracy, confirms whether the overall recognition accuracy is greater than or equal to a threshold accuracy to generate a confirmation result, and determines whether to adjust a weight value corresponding to the at least one second image capturing device according to the confirmation result.

According to another aspect of the present disclosure, an image recognition method for identifying an object in a target area includes performing an image capturing step, a recognition step, and a judgment step. The image capturing step includes capturing a first image in a first angle of view of the target area by a first image capturing device and capturing a second image in a second angle of view of the target area by a second image capturing device. The recognition step is performing by a recognition module of a processing device and includes obtaining the first image and the second image, identifying the object from the first angle of view to obtain a first recognition accuracy, and identifying the object from the second angle of view to obtain a second recognition accuracy. The judgment step is performing by a judgment module of the processing device and includes generating an overall recognition accuracy according to at least one of the first recognition accuracy and the second recognition accuracy, confirming whether the overall recognition accuracy is greater than or equal to a threshold accuracy to generate a confirmation result, and determining whether to adjust a weight value corresponding to the at least one second image capturing device according to the confirmation result.

BRIEF DESCRIPTION OF THE DRAWINGS

The present disclosure can be more fully understood by reading the following detailed description of the embodiment, with reference made to the accompanying drawings as follows.

DETAILED DESCRIPTION

The embodiment will be described with the drawings. For clarity, some practical details will be described below. However, it should be noted that the present disclosure should not be limited by the practical details, that is, in some embodiment, the practical details is unnecessary. In addition, for simplifying the drawings, some conventional structures and elements will be simply illustrated, and repeated elements may be represented by the same labels.

It will be understood that when an element (or device) is referred to as be "connected to" another element, it can be directly connected to the other element, or it can be indirectly connected to the other element, that is, intervening elements may be present. In contrast, when an element is referred to as be "directly connected to" another element, there are no intervening elements present. In addition, the terms first, second, third, etc. are used herein to describe various elements or components, these elements or components should not be limited by these terms. Consequently, a first element or component discussed below could be termed a second element or component.

Figure 1:
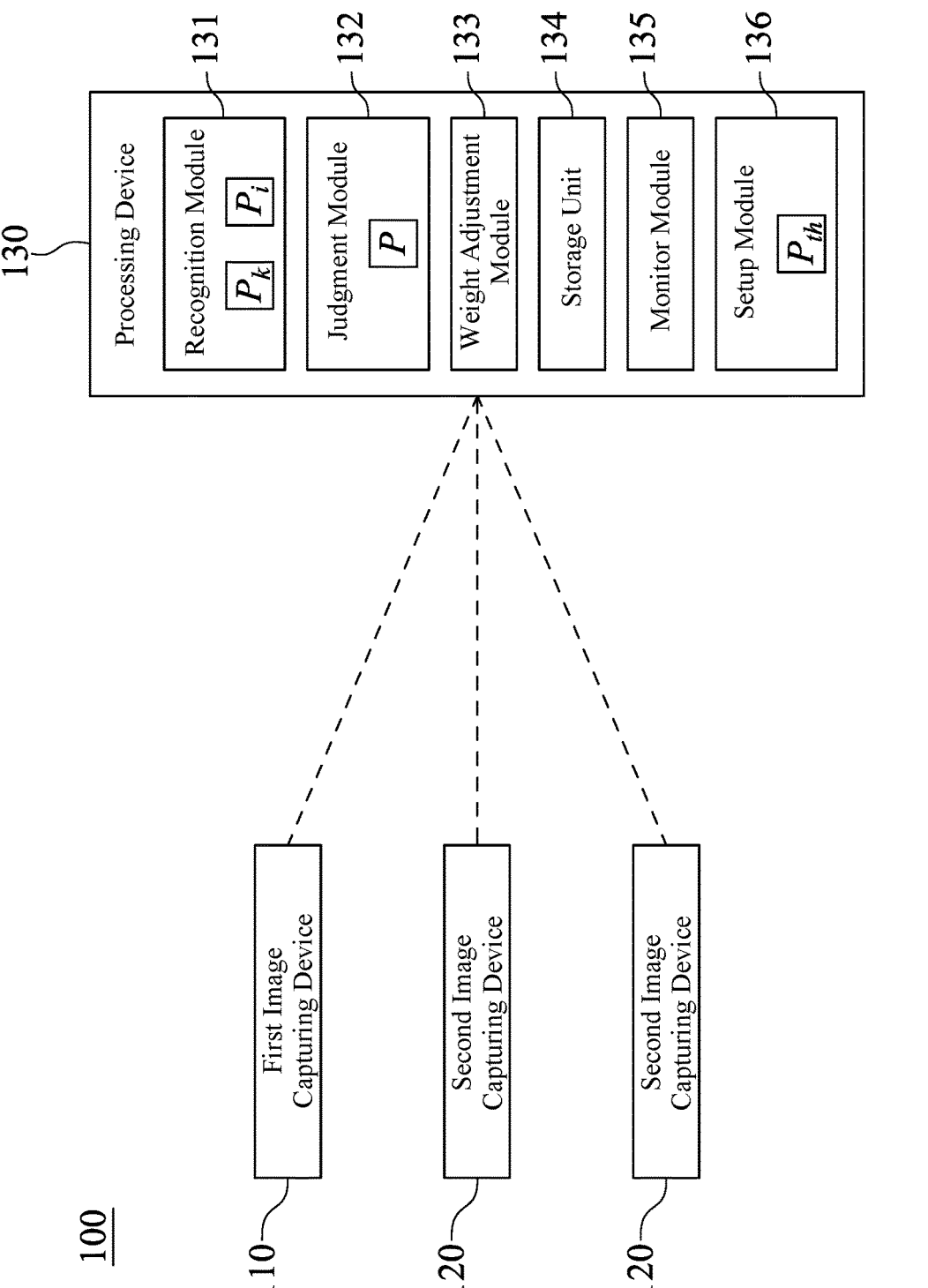
FIG. 1 is a block diagram of an image recognition system according to a first embodiment of the present disclosure.
Figure 2:
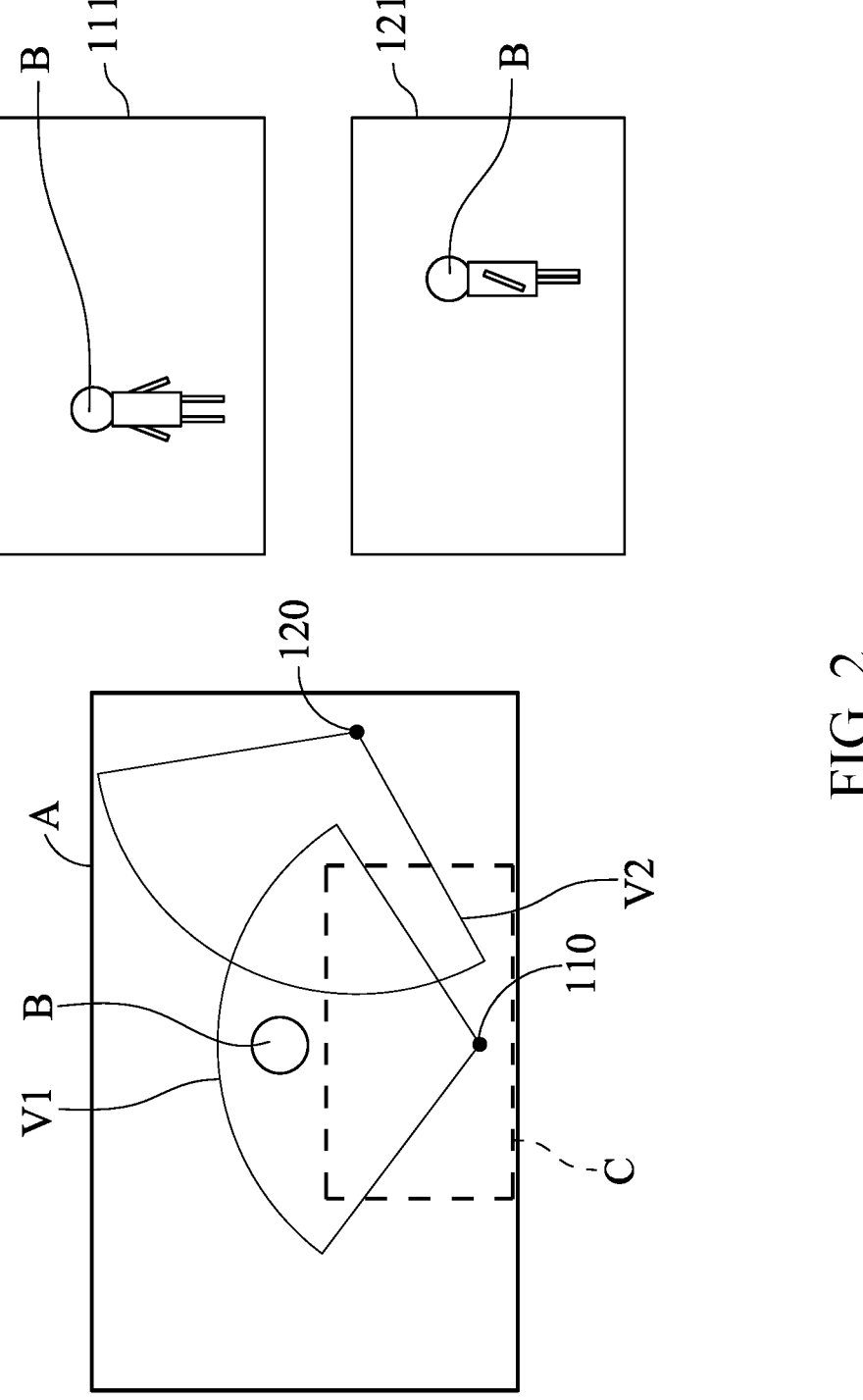
FIG. 2 is a schematic diagram illustrating a monitoring scenario of the image recognition system shown in FIG. 1.
Figure 3:
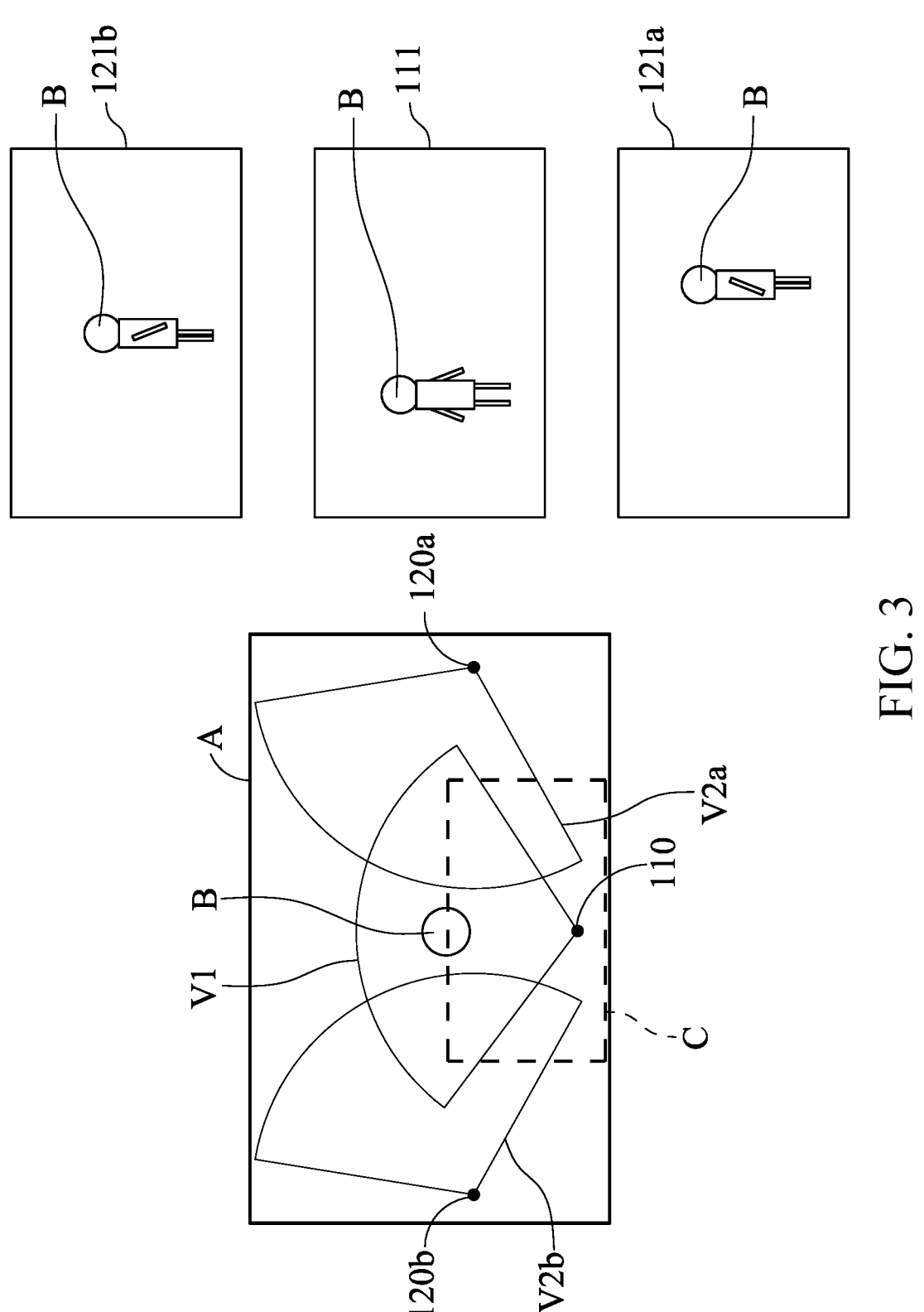
FIG. 3 is a schematic diagram illustrating another monitoring scenario of the image recognition system shown in FIG. 1.

Referring to FIG. 1 to FIG. 3. FIG. 1 is a block diagram of an image recognition system 100 according to a first embodiment of the present disclosure; FIG. 2 is a schematic diagram illustrating a monitoring scenario of the image recognition system 100 shown in FIG. 1; and FIG. 3 is a schematic diagram illustrating another monitoring scenario of the image recognition system 100 shown in FIG. 1. The image recognition system 100 is used to identify an object B in a target area A, and through condition setting, the image recognition system 100 can self-adjust to enhance the recognition effect. The image recognition system 100 includes a first image capturing device 110, at least one second image capturing device 120, and a processing device 130. The processing device 130 is signally connected to the first image capturing device 110 and the at least one second image capturing device 120. In this embodiment, the first image capturing device 110 and the at least one second image capturing device 120 can be a camera or a video camera, and the processing device 130 can be a cloud server or cloud host, but the invention is not limited thereto.

The first image capturing device 110 is used to capture a first image 111 in a first angle of view V1 of the target area A, and the at least one second image capturing device 120 is used to capture a second image 121 in a second angle of view V2 of the target area A. The first image capturing device 110 and the at least one second image capturing device 120 are installed at different positions in the target area A, and the first angle of view V1 and the second angle of view V2 partially overlap.

Referring to the monitoring scenario shown in FIG. 2, in this embodiment, the target area A monitored by the image recognition system 100 is the courtyard in front of the house, the object B is a person, and the first image capturing device 110 and the at least one second image capturing device 120 are cameras. The first image capturing device 110 is located in front of the door. The number of the at least one second image capturing device 120 is one, and the second image capturing device 120 is located on the right side of the house. The first image capturing device 110 is used to capture the first image 111 in the first angle of view V1 on the courtyard in front of the house, and the second image capturing device 120 is used to capture the second image 121 in the second angle of view V2 on the right side of the house. Moreover, referring to the monitoring scenario shown in FIG. 3, the difference between this embodiment and the embodiment in FIG. 2 is that the number of at least one second image capturing device 120 is two, namely a second image capturing device 120a and a second image capturing device 120b. The second image capturing device 120a is located on the right side of the house, and the second image capturing device 120b is located on the left side of the house. The first image capturing device 110 is used to capture the first image 111 in the first angle of view V1 on the courtyard in front of the house; the second image capturing device 120a is used to capture the second image 121a in the second angle of view V2a; and the second image capturing device 120b is used to capture the second image 121b in the second angle of view V2b.

The processing device 130 includes a recognition module 131 and a judgment module 132. The recognition module 131 is used to obtain the first image 111 and the second image 121, identify the object B appearing in the first angle of view V1 to obtain a first recognition accuracy $P_k$, and identify the object B appearing in the second angle of view V2 to obtain a second recognition accuracy $P_i$.

Figure 7:
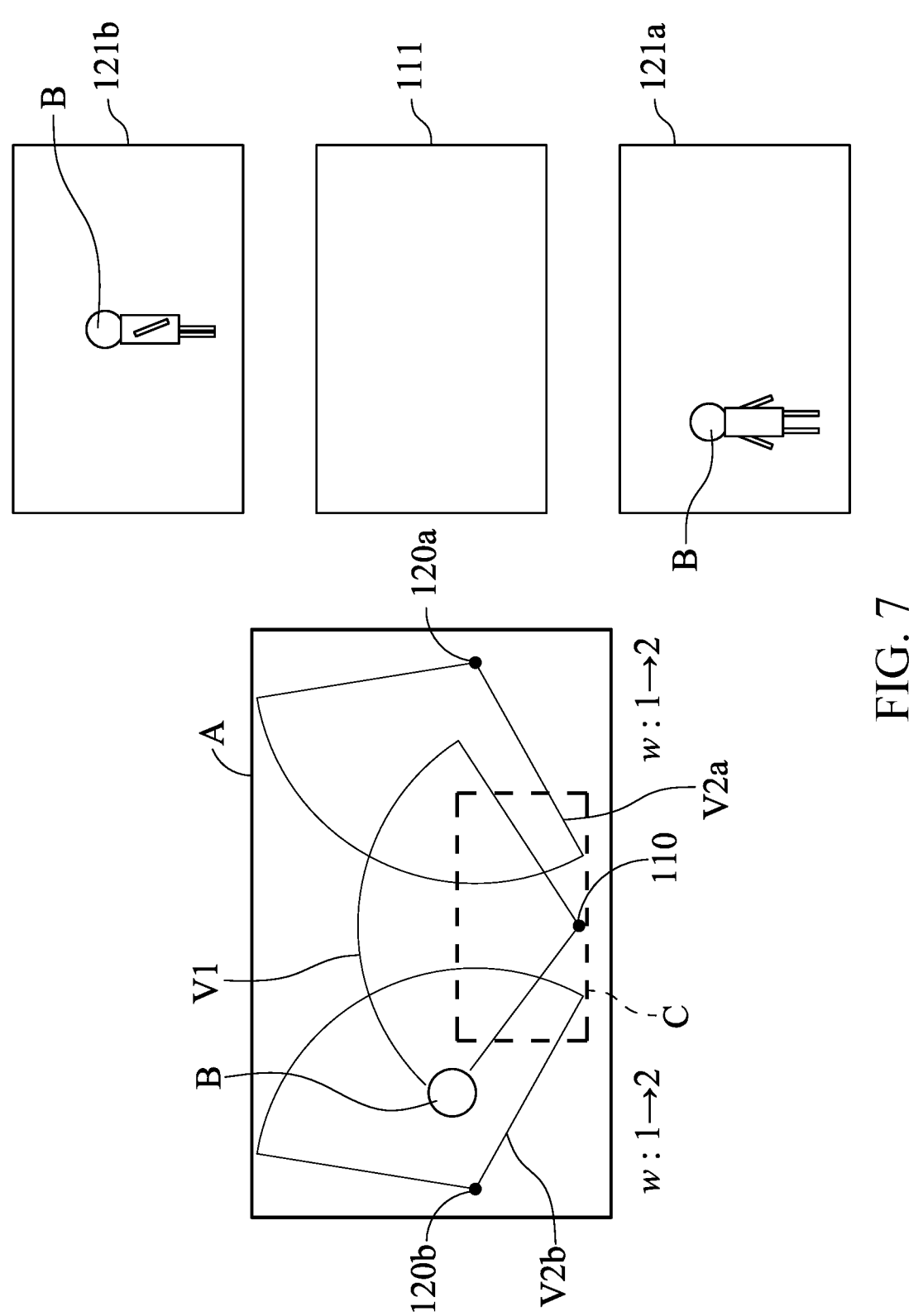
FIG. 7 is a schematic diagram illustrating a weight adjustment scenario of the present disclosure.

The judgment module 132 generates an overall recognition accuracy P based on at least one of the first recognition accuracy $P_k$ and the second recognition accuracy $P_i$, generates a confirmation result by confirming whether the overall recognition accuracy P is greater than or equal to a threshold accuracy $P_{th}$; and then determines whether to adjust a weight value w of the at least one second image capturing device 120 according to the confirmation result (see FIG. 7). The weight value w corresponding to the at least one second image capturing device 120 is used to provide the processing device 130 for subsequent image analysis as a whole. Specifically, the recognition reliability of the image recognition system 100 can be enhanced by adjusting the weight value w so as to avoid misjudgment due to environment factors affecting the image source of either the first image capturing device 110 or the at least one second image capturing device 120.

The judgment module 132 analyzes at least one of the first image 111 and the second image 121 according to the confirmation result to obtain the target information of the object B in the target area A. The target information includes a target location, a target size and a target path.

In one embodiment, the processing device 130 further includes a weight adjustment module 133, a storage unit 134, a monitor module 135 and a setup module 136. The weight adjustment module 133 is used to adjust the weight value w corresponding to the at least one second image capturing device 120 according to the confirmation result. The storage unit 134 is used to store the first image 111 and the second image 121. The monitor module 135 is used to trigger a warning signal when it is determined that the target location of the object B is situated in a warning zone C of the target area A, and store the first image 111 and the second image 121 in the storage unit 134. The setup module 136 is used to set the threshold accuracy $P_{th}$, the warning zone C, and the initial value of the weight value w corresponding to the at least one second image capturing device 120.

Figure 4:
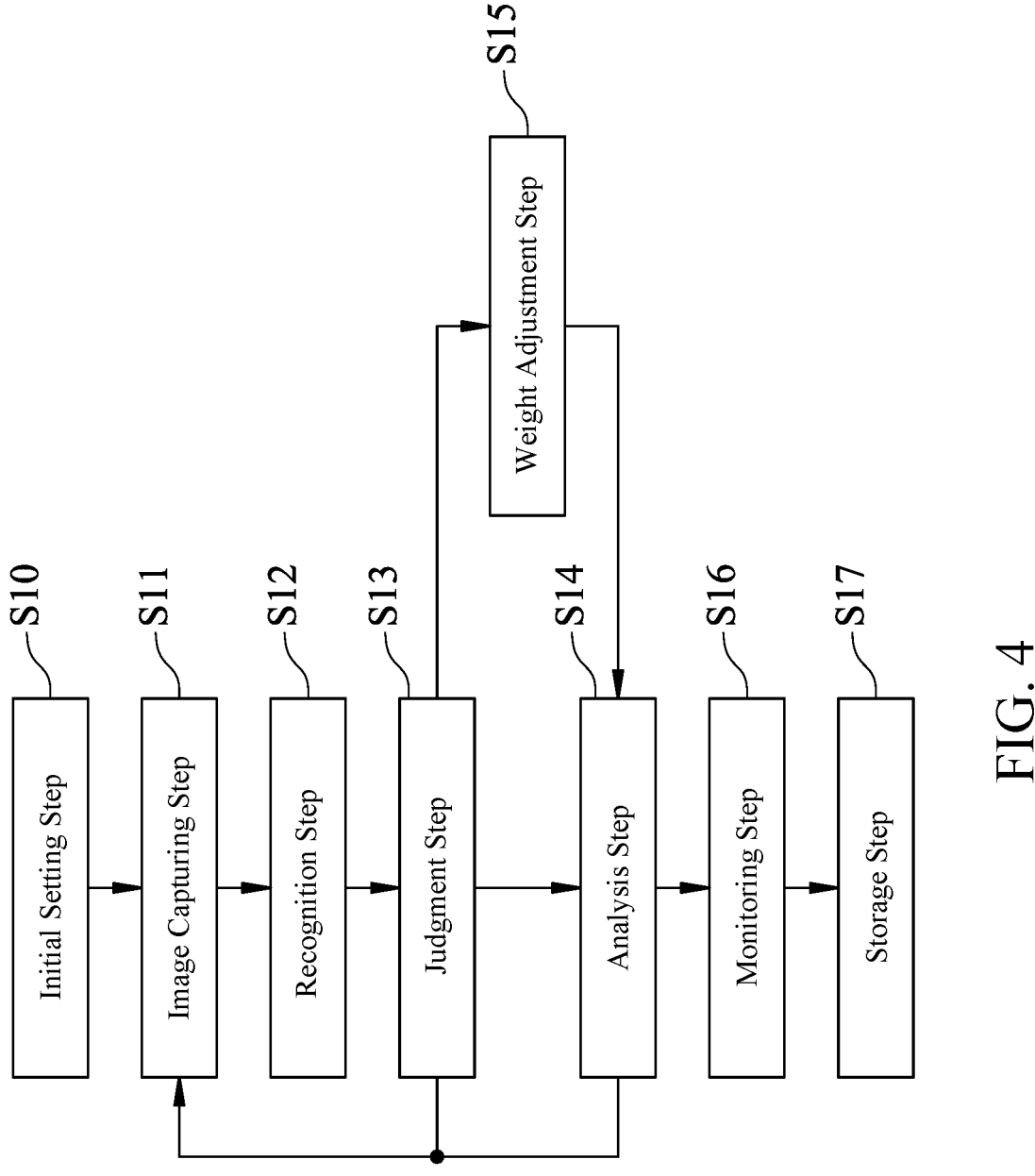
FIG. 4 is a flowchart of an image recognition method according to a second embodiment of the present disclosure.

Referring to FIG. 1 to FIG. 4. FIG. 4 is a flowchart of an image recognition method S1 according to a second embodiment of the present disclosure. The image recognition system 100 in FIG. 1 is configured to implement the image recognition method S1. The image recognition method S1 is used to identify the object B in the target area A, and the image recognition system 100 is self-adjusted through condition setting to enhance recognition effect. The image recognition method S1 includes an image capturing step S11, a recognition step S12, and a judgment step S13, and the execution order of the above steps is the image capturing step S11, the recognition step S12, and the judgment step S13.

The image capturing step S11 includes driving the first image capturing device 110 to capture the first image 111 in the first angle of view V1 of the target area A, and driving the at least one second image capturing device 120 to capture the second image 121 in the second angle of view V2 of the target area A.

The recognition step S12 includes driving the recognition module 131 of the processing device 130 to obtain the first image 111 and the second image 121, identify the object B that appears within the first angle of view V1 to obtain the first recognition accuracy $P_k$, and identify the object B that appears within the second angle of view V2 to obtain the second recognition accuracy $P_i$.

The judgment step S13 includes driving the judgment module 132 of the processing device 130 to generate an overall recognition accuracy P based on at least one of the first recognition accuracy $P_k$ and the second recognition accuracy $P_i$, and confirm whether the overall recognition accuracy P is greater than or equal to the threshold accuracy $P_{th}$ to generate the confirmation result, and then determine whether to adjust the weight value w corresponding to the at least one second image capturing device 120 according to the confirmation result.

In this embodiment, the image recognition method S1 further includes an initial setting step S10, an analysis step S14, a weight adjustment step S15, a monitoring step S16 and a storage step S17. The initial setting step S10 is performed before the image capturing step S11 and is only performed when the image recognition system 100 is activated for the first time. The weight adjustment step S15 is executed after the judgment step S13. The analysis step S14 is executed after the judgment step S13 or the weight adjustment step S15. The monitoring step S16 and the storage step S17 are executed in sequence after the analysis step S14.

The initial setting step S10 includes driving the setup module 136 to set the threshold accuracy $P_{th}$, the warning zone C and the initial value of the weight value w corresponding to the at least one second image capturing device 120.

The analysis step S14 includes driving the judgment module 132 to analyze at least one of the first image 111 and the second image 121 according to the confirmation result to obtain the target information of the object B in the target area A.

The weight adjustment step S15 includes driving the weight adjustment module 133 to adjust the weight value w corresponding to the at least one second image capturing device 120 according to a preliminary result and the confirmation result. In this embodiment, when the number of at least one second image capturing device 120 is plural, the weight adjustment step S15 further includes driving the weight adjustment module 133 to increase the corresponding weight value w of any second image capturing device 120 which satisfies the condition of their second recognition accuracy $P_i$ being greater than or equal to the accuracy threshold $P_{th}$. Thereby, the recognition reliability of the image recognition system 100 can be enhanced by adjusting the weight value w.

The monitoring step S16 includes driving the monitor module 135 to trigger a warning signal when it is determined that the target location of the object B is situated within the warning zone C of the target area A. The storage step S17 includes driving the monitor module 135 to store the first image 111 and the second image 121 in the storage unit 134 after triggering the warning signal. The details of each of the above steps will be described below through more detailed embodiments.

Figure 5:
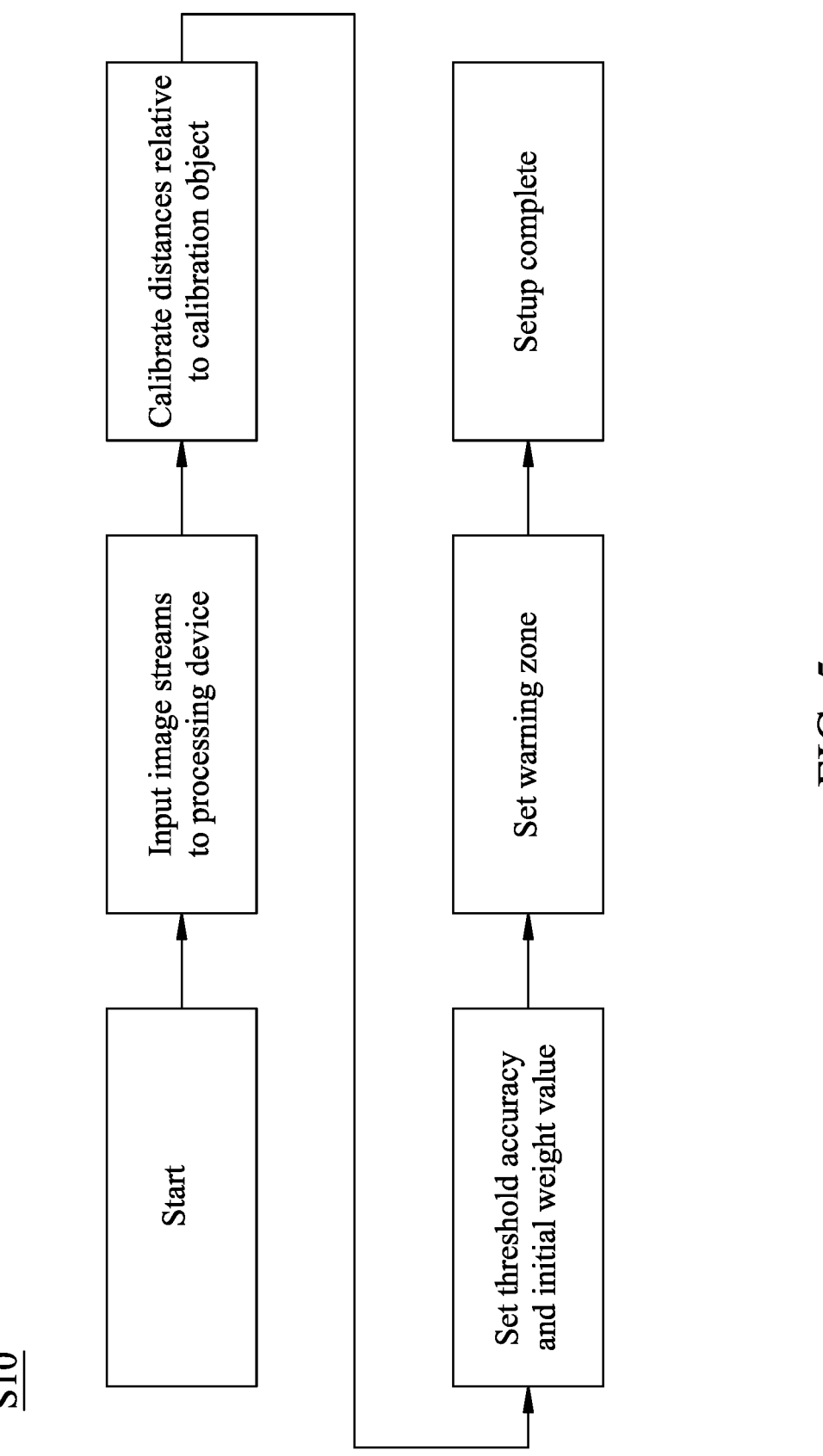
FIG. 5 is a flowchart of an initial setting step in the image recognition method shown in FIG. 4.

Referring to FIG. 5. FIG. 5 is a flowchart of the initial setting step S10 in the image recognition method S1 shown in FIG. 4. The initial setting step S10 is performed when the image recognition system 100 is activated for the first time and includes driving the setup module 136 to obtain the first image 111 and the second image 121 from the first image capturing device 110 and the at least one second image capturing device 120, and inputting the image streams such as the first image 111 and the second image 121 to the processing device 130. By measuring the size of a calibration object placed in the target area A, the setup module 136 can calibrate distances relative to the calibration object in the target area A. Then the setup module 136 is driven to set the value of threshold accuracy $P_{th}$, the initial value of the weight value w corresponding to the at least one second image capturing device 120, and the range of the warning zone C.

Figure 6:
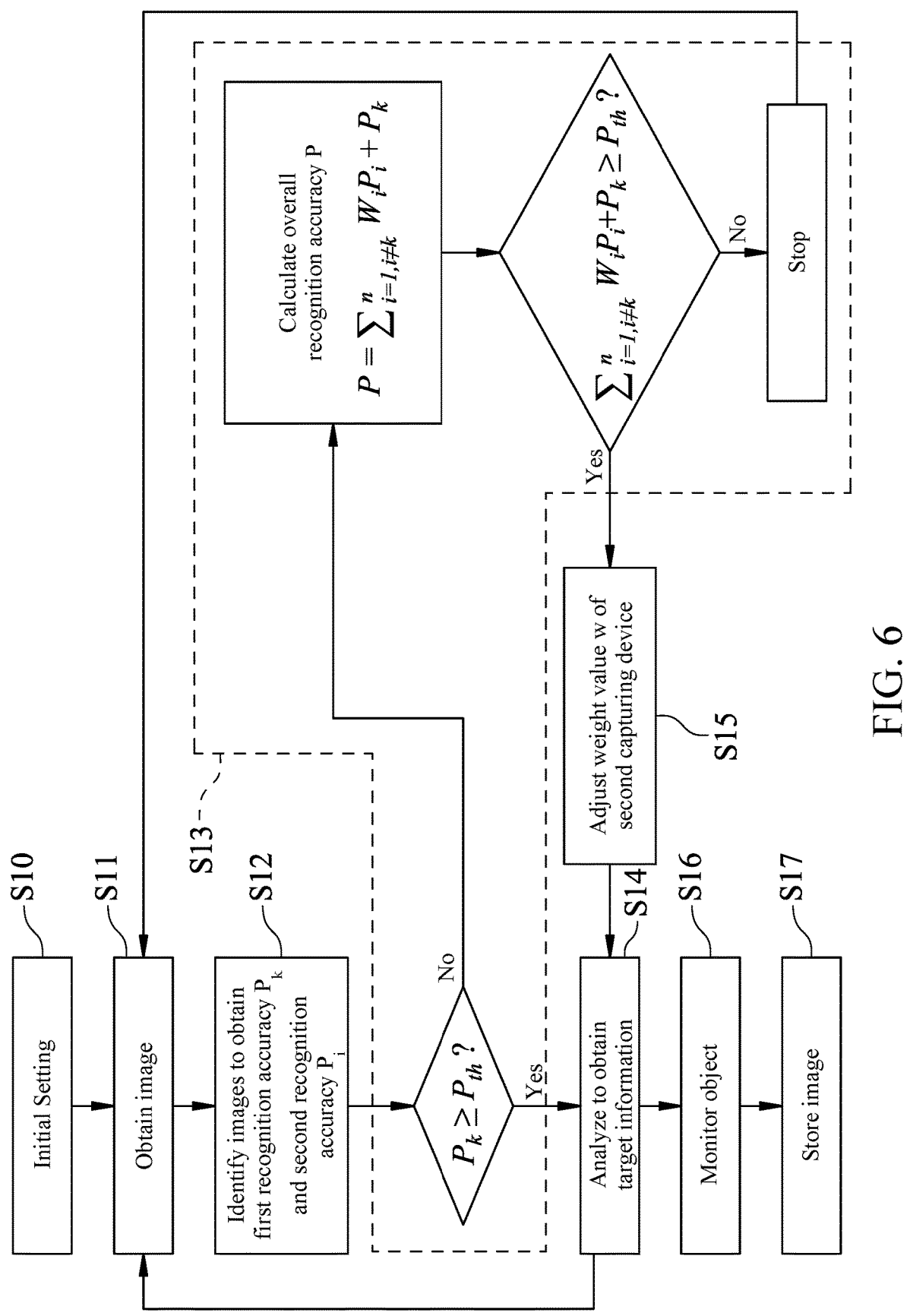
FIG. 6 is a flowchart illustrating steps of the image recognition method shown in FIG. 4.

Referring to FIG. 6. FIG. 6 is a flowchart illustrating steps of the image recognition method S1 shown in FIG. 4. After obtaining the first recognition accuracy $P_k$ and the second recognition accuracy $P_i$ from the recognition step S12, in the judgment step S13, the judgment module 132 is driven first to confirm whether the first recognition accuracy $P_k$ is greater than or equal to the threshold accuracy $P_{th}$ to generate the preliminary result.

When the preliminary result is affirmative, the judgment module 132 determines that the first recognition accuracy $P_k$ is equal to the overall recognition accuracy P according to the preliminary result, and at the same time determines that the confirmation result is affirmative, and then continues to execute the analysis step S14 to analyze the first image 111 to obtain the target information of the object B in the target area A. Specifically, when the judgment module 132 determines that the preliminary result is affirmative because the first recognition accuracy $P_k$ of the first image capturing device 110 is greater than or equal to the threshold accuracy $P_{th}$, it means that the first image capturing device 110 is free from image issues like blur or obstruction by obstacles. Thus, it is sufficient to identify the object B clearly with just the first image capturing device 110, so only a single first image 111 is needed to analyze the target B.

On the contrary, when the preliminary result is negative, the judgment module 132 combines the first recognition accuracy $P_k$ and the second recognition accuracy $P_i$ to generate the overall recognition accuracy P. At this time, the overall recognition accuracy P conforms to the following formula (1):

$$P = \sum\nolimits_{i=1, i \neq k}^{n} W_i P_i + P_k \qquad (1)$$

Wherein, $W_i$ is the image weight of the at least one second image capturing device 120, n is the sum of the number of the first image capturing device 110 and the second image capturing device 120, and i is the numbering of the second image capturing device 120, k is the numbering of the first image capturing device 110. The value of the image weight $W_i$ is a fraction and has a denominator and a numerator. The denominator is the sum of the weight values w of all the second image capturing devices 120 whose second recognition accuracy $P_i$ is greater than or equal to the threshold accuracy $P_{th}$. The numerator is the weight value w of the second image capturing device 120 corresponding to the numbering.

For example, assume that the first recognition accuracy $P_k$ of the first image capturing device 110 is 0.2, the number of at least one second image capturing device 120 is two, and the two second image capturing devices 120*a*, 120*b* are respectively numbered 1 and 2. The weight value w of the second image capturing device 120*a* is 1, and the second recognition accuracy $P_1$ is 0.9; the weight value w of the second image capturing device 120*b* is 2, and the second recognition accuracy $P_2$ is 0.8. If the threshold accuracy $P_{th}$ is 0.7, the judgment module 132 will determine that the preliminary result is negative, and combine the first recognition accuracy $P_k$ and the second recognition accuracy $P_i$ to generate the overall recognition accuracy P. Since the second recognition accuracies $P_1$ and $P_2$ of the second image capturing devices 120*a* and 120*b* are both greater than the threshold accuracy $P_{th}$, the image weight $W_1$ of the second image capturing device 120a can be calculated as $$\frac{1}{1+2} = \frac{1}{3},$$

and the image weight $W_2$ of the second image capturing device 120b can be calculated as $$\frac{2}{1+2} = \frac{2}{3}.$$

At this time, the overall recognition accuracy P can be calculated as $$\sum\nolimits_{i=1,i\neq k}^{n} W_i P_i + P_k = W_1 P_1 + W_2 P_2 + P_k = \frac{1}{3} \times 0.9 + \frac{2}{3} \times 0.8 + 0.2 = 1.033.$$

The judgment module 132 then confirms whether the overall recognition accuracy P is greater than or equal to the threshold accuracy $P_{th}$ and generates the confirmation result. At this time, when the preliminary result is negative and the confirmation result is affirmative, the weight adjustment step S15 is executed to drive the weight adjustment module 133 to increase the weight value w corresponding to the at least one second image capturing device 120. Then, the analysis step S14 is executed to analyze the first image 111 and the second image 121 to obtain the target information of the object B in the target area A. Specifically, when the judgment module 132 determines that the preliminary result is negative because the first recognition accuracy $P_k$ of the first image capturing device 110 is less than the threshold accuracy $P_{th}$, it means that the first image capturing device 110 cannot identify the object B clearly. Therefore, it is necessary to increase the weight value w of the second image capturing device 120 whose second recognition accuracy $P_i$ is greater than or equal to the threshold accuracy $P_{th}$ first, and then combine the second image capturing device 120 to enhance the overall recognition by analyzing the object B with the first image 111 and the second image 121. Similarly, when the preliminary result is negative and the confirmation result is also negative, it means that neither the first image capturing device 110 nor the at least one second image capturing device 120 can identify the object B clearly. At this point, the judgment step S13 will end (i.e., "Stop" in FIG. 6) and the image capturing step S11 is re-executed until the overall recognition accuracy P is greater than or equal to the threshold accuracy $P_{th}$ and the confirmation result is affirmative.

Figure 8:
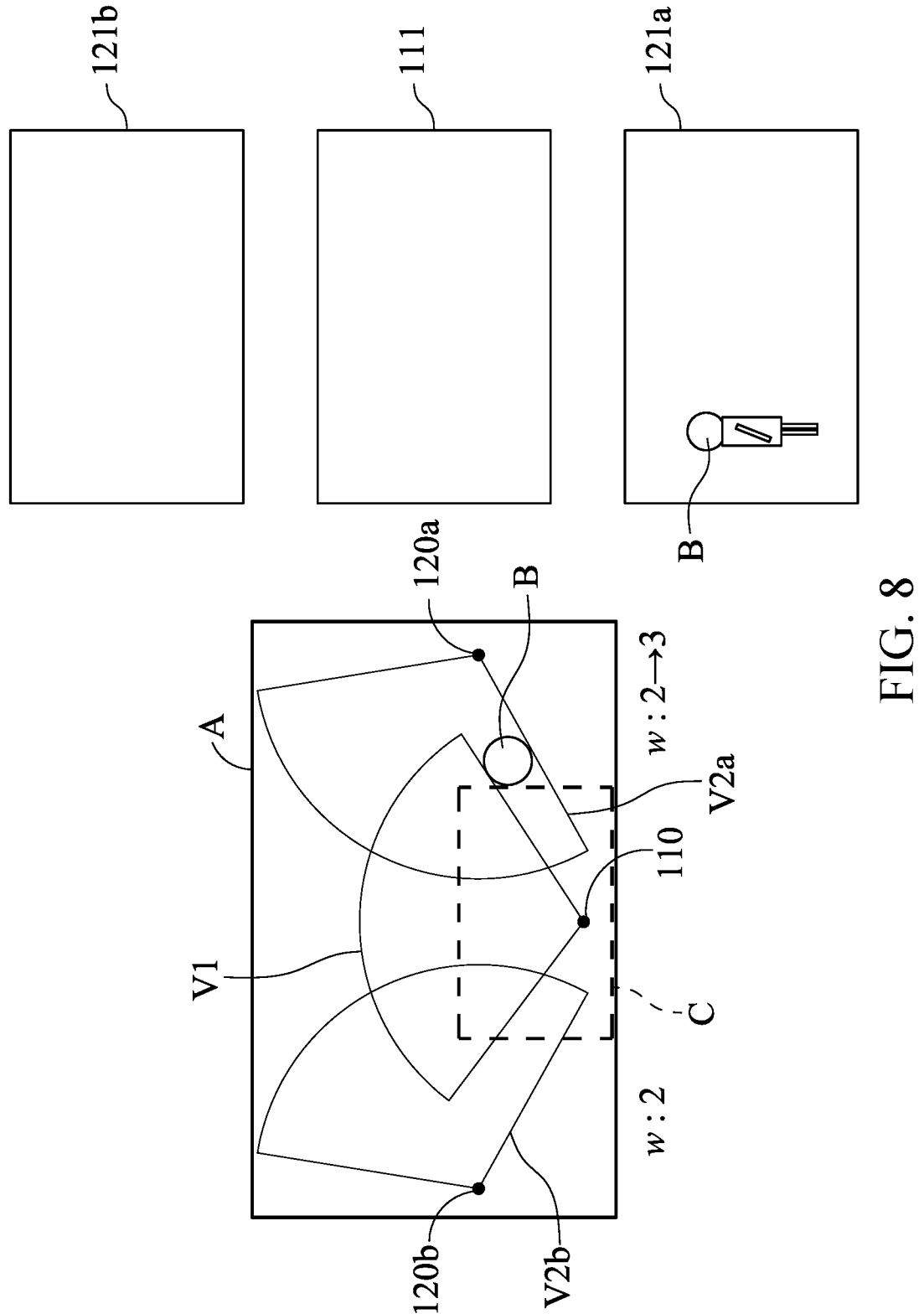
FIG. 8 is a schematic diagram illustrating another weight adjustment of the present disclosure.

The details of the weight adjustment step S15 are further explained herein with reference to FIG. 1, FIG. 7, and FIG. 8. FIG. 7 is a schematic diagram illustrating a weight adjustment scenario of the present disclosure, and FIG. 8 is a schematic diagram illustrating another weight adjustment of the present disclosure.

In the embodiment of FIG. 7, the target area A monitored by the image recognition system 100 is the courtyard in front of the house, the object B is a person, the first image capturing device 110 is installed in front of the door, and there are two second image capturing devices 120a and 120b respectively numbered 1 and 2. The second image capturing device 120a is located on the right side of the house, the second image capturing device 120b is located on the left side of the house, and the weight values w of the second image capturing devices 120a and 120b are both 1. When the object B approaches from the left side of the house and is located in the blind spot of the first angle of view V1 of the first image capturing device 110, it cannot be identified by the first image capturing device 110 and can only be identified by the second image capturing devices 120a, 120b. The recognition module 131 obtains the first recognition accuracy $P_k$ as 0, the second recognition accuracy $P_1$ as 0.9, and the second recognition accuracy $P_2$ as 0.8. Assume that the threshold accuracy $P_{th}$ is 0.7, when the judgment step S13 determines that the preliminary result is negative, and calculates the overall recognition accuracy P based on the above formula (1) and determines that the confirmation result is affirmative, the weight adjustment step S15 is subsequently preformed. Since the second recognition accuracy $P_1$ and the second recognition accuracy $P_2$ are both greater than the threshold accuracy $P_{th}$, the weight values w of the second image capturing devices 120a and 120b are adjusted from 1 to 2 to enhance the recognition effect.

In the embodiment of FIG. 8, the scene is the same as that is shown in FIG. 7. When another object B approaches from the right side of the house and is located in the blind spot of the first angle of view V1 of the first image capturing device 110 and the blind spot of the second angle of view V2b of the second image capturing device 120b, the other object B cannot be identified by the first image capturing device 110 and the second image capturing device 120b but only by the second image capturing device 120a. The recognition module 131 obtains the first recognition accuracy $P_k$ as 0, the second recognition accuracy $P_1$ as 0.9, and the second recognition accuracy $P_2$ as 0.3. Assume that the threshold accuracy $P_{th}$ is 0.7, when the judgment step S13 determines that the preliminary result is negative, and calculates the overall recognition accuracy P based on the above formula (1) and determines that the confirmation result is affirmative, the weight adjustment step S15 is subsequently performed. Since the second recognition accuracy $P_1$ is greater than the threshold accuracy $P_{th}$, and the second recognition accuracy $P_2$ is less than the threshold accuracy $P_{th}$, the weight value w of the second image capturing device 120a is adjusted from 2 to 3 to further enhance the recognition effect.

Hence, the adjustment of the weight value w can further strengthen the image area with high recognition, thereby enhancing the recognition reliability of the image recognition system 100, preventing misjudgment due to issues related to the image source of the first image capturing device 110 or the at least one second image capturing device 120 caused by environmental factors.

In summary, the present disclosure has the following advantages. First, by covering overlapping viewing angles through the first image capturing device and the second image capturing device, the processing device is able to combine the images and analyze the object, and as such, additional correction time can be saved and the influence of environmental factors on image recognition can be reduced. Second, the execution of self-weight adjustment is determined with set conditions by the judgment module and the weight adjustment module so as to further strengthen the judgment of the image areas with high recognition as a whole, which has the effect of enhancing the recognition effect, recognition accuracy and reliability.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. An image recognition system for identifying an object in a target area, the image recognition system comprising:
a first image capturing device for capturing a first image in a first angle of view of the target area;
at least one second image capturing device for capturing a second image in a second angle of view of the target area; and
a processing device signally connected to the first image capturing device and the at least one second image capturing device and comprising:
a recognition module for obtaining the first image and the second image, identifying the object from the first angle of view to obtain a first recognition accuracy, and identifying the object from the second angle of view to obtain a second recognition accuracy;
a judgment module for generating an overall recognition accuracy based on at least one of the first recognition accuracy and the second recognition accuracy, confirming whether the overall recognition accuracy is greater than or equal to a threshold accuracy to generate a confirmation result; and determining whether to adjust a weight value corresponding to the at least one second image capturing device according to the confirmation result; and
a weight adjustment module for adjusting the weight value corresponding to the at least one second image capturing device according to a preliminary result and the confirmation result;
wherein, when the preliminary result is negative and the confirmation result is affirmative, the weight adjustment module increases the weight value; and
wherein a number of the at least one second image capturing device is plural, and the weight adjustment module increases the weight values corresponding to those in the at least one second image capturing device whose second recognition accuracies are greater than or equal to the threshold accuracy.

2. The image recognition system of claim 1, wherein the judgment module analyzes at least one of the first image and the second image according to the confirmation result to obtain a target information of the object in the target area.

3. The image recognition system of claim 2, wherein the judgment module confirms whether the first recognition accuracy is greater than or equal to the threshold accuracy and generates the preliminary result;
wherein, when the preliminary result is affirmative, the judgment module determines the first recognition accuracy to be equal to the overall recognition accuracy according to the preliminary result, and determines the confirmation result to be affirmative, and analyzes the first image to obtain the target information of the object in the target area.

4. The image recognition system of claim 3, wherein when the preliminary result is negative, the judgment module combines the first recognition accuracy and the second recognition accuracy to generate the overall recognition accuracy and the confirmation result;

wherein, when the confirmation result is affirmative, the judgment module analyzes the first image and the second image to obtain the target information of the object in the target area.

5. The image recognition system of claim 2, wherein the target information comprises a target location, and the processing device further comprises:
a storage unit; and
a monitor module for triggering a warning signal when the target location is situated in a warning zone of the target area and storing the first image and the second image in the storage unit.

6. The image recognition system of claim 5, wherein the processing device further comprises:
a setup module for setting the threshold accuracy, an initial value of the weight value corresponding to the at least one second image capturing device, and the warning zone.

7. The image recognition system of claim 1, wherein the first image capturing device and the at least one second image capturing device are installed at different positions in the target area, and the first angle of view and the second angle of view partially overlap.

8. An image recognition method for identifying an object in a target area, the image recognition method comprising:
performing an image capturing step comprising capturing a first image in a first angle of view of the target area by a first image capturing device and capturing a second image in a second angle of view of the target area by a second image capturing device;
performing, by a recognition module of a processing device, a recognition step comprising obtaining the first image and the second image, identifying the object from the first angle of view to obtain a first recognition accuracy, and identifying the object from the second angle of view to obtain a second recognition accuracy;
performing, by a judgment module of the processing device, a judgment step comprising generating an overall recognition accuracy according to at least one of the first recognition accuracy and the second recognition accuracy, confirming whether the overall recognition accuracy is greater than or equal to a threshold accuracy to generate a confirmation result, and determining whether to adjust a weight value corresponding to the at least one second image capturing device according to the confirmation result; and
performing, by a weight adjustment module of the processing device, a weight adjustment step comprising adjusting the weight value corresponding to the at least one second image capturing device according to a preliminary result and the confirmation result;
wherein, when the preliminary result is negative and the confirmation result is affirmative, the weight adjustment module increases the weight value; and
wherein a number of the at least one second image capturing device is plural, and the weight adjustment step further comprises the weight adjustment module increasing the weight values corresponding to those in the at least one second image capturing device whose second recognition accuracies are greater than or equal to the threshold accuracy.

9. The image recognition method of claim 8, further comprising:
performing, by the judgment module, an analysis step comprising analyzing at least one of the first image and the second image according to the confirmation result to obtain a target information of the object in the target area.

10. The image recognition method of claim 9, wherein the judgment step further comprises the judgment module confirming whether the first recognition accuracy is greater than or equal to the threshold accuracy to generate the preliminary result;

wherein, when the preliminary result is affirmative, the judgment module determines the first recognition accuracy to be the overall recognition accuracy according to the preliminary result, and determines the confirmation result to be affirmative, and analyzes the first image in the analysis step to obtain the target information of the object in the target area.

11. The image recognition method of claim 10, wherein when the preliminary result is negative, the judgment module combines the first recognition accuracy and the second recognition accuracy to generate the overall recognition accuracy and generates the confirmation result;

wherein, when the confirmation result is affirmative, the judgment module analyzes the first image and the second image in the analysis step to obtain the target information of the object in the target area.

12. The image recognition method of claim 9, wherein the target information comprises a target location, and the image recognition method further comprises:

performing, by a monitor module of the processing device, a monitoring step comprising triggering a warning signal when the target location is determined to be situated in a warning zone of the target area.

13. The image recognition method of claim 12, further comprising:

performing, by the monitor module, a storage step comprising storing the first image and the second image in a storage unit of the processing device after triggering the warning signal.

14. The image recognition method of claim 12, further comprising:

performing, by a setup module of the processing device, an initial setting step comprising setting the threshold accuracy, an initial value of the weight value corresponding to the at least one second image capturing device, and the warning zone.

* * * * *